(12) United States Patent
Akiyama et al.

(10) Patent No.: US 6,409,370 B1
(45) Date of Patent: Jun. 25, 2002

(54) VEHICULAR LAMP LENS HAVING AN INDENTED FRONT SURFACE

(75) Inventors: Kazuo Akiyama; Fujihiko Sugiyama; Masahiko Nishizaki, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/507,684

(22) Filed: Feb. 22, 2000

(30) Foreign Application Priority Data

Feb. 22, 1999 (JP) .......................................... 11-042781

(51) Int. Cl.⁷ ................................................ F21Q 1/00
(52) U.S. Cl. ...................... 362/520; 362/521; 362/332; 362/310; 362/267; 362/522
(58) Field of Search ................................. 362/520, 521, 362/522, 267, 310, 332; 359/644, 645, 646

(56) References Cited

U.S. PATENT DOCUMENTS

| | | | | |
|---|---|---|---|---|
| 4,447,862 A | * | 5/1984 | Shanks ....................... | 362/267 |
| 6,000,814 A | * | 12/1999 | Nestell et al. .............. | 362/267 |
| 6,017,141 A | * | 1/2000 | Sugiyama et al. .......... | 362/520 |
| 6,045,247 A | * | 4/2000 | Fukuhara .................... | 362/543 |
| 6,089,731 A | * | 7/2000 | Sugiyama et al. .......... | 362/310 |

* cited by examiner

*Primary Examiner*—Sandra O'Shea
*Assistant Examiner*—Anable Ton
(74) *Attorney, Agent, or Firm*—Sughrue Mion, PLLC

(57) ABSTRACT

A vehicular lamp lens having integrated lens members with a boundary therebetween. The front surface of the boundary portion side of at least one of the lens members is displaced in the rearward direction as the surface becomes closer to the boundary.

13 Claims, 2 Drawing Sheets

VEHICULAR LAMP LENS HAVING AN INDENTED FRONT SURFACE

FIELD OF THE INVENTION

The present invention relates to a vehicular lamp lens. More specifically, the present invention relates to a vehicular lamp lens having an improved appearance and feel when touched with a finger.

BACKGROUND OF THE INVENTION

Vehicular lamp lenses having a plurality of lens members welded together are known. For example, there is such a lens used in a so-called combination lamp.

As shown in FIG. 3, when lens members a, b having respective protruding welding legs c, d are welded together, the welding is performed with the welding legs c, d abutting against the other lens member b, a, respectively.

However, a deviation between the welded lens members a, b often occurs due to various problems such as imprecision of the jig and imprecision of the lens member placement during welding. As a result, a step f is created at the lens member boundary portion e, resulting in a degradation in the appearance and also in the feel of the welded lens members when touched with a finger.

In view with the foregoing problems, it is an object of the present invention to improve the appearance and feel of a vehicular lamp lens.

SUMMARY OF THE INVENTION

To solve the aforementioned problems, the front surface of at least one of the lens members of the vehicular lamp lens according to the present invention is formed so as to become more rearwardly displaced (i.e., in a direction toward the rear of the lamp) as the front surface becomes closer to the location where the lens member is welded to another lens member. An indentation is thereby formed.

Therefore, when viewed from the front side of the vehicular lamp lens, any deviation between the welded lens members at a location of the surface displacement does not visually stand out. In addition, when touched with a finger, the deviation is almost unnoticeable because the original surface displacement makes a stronger impression.

DESCRIPTION OF THE PREFERRED EMBODIMENTS

The vehicular lamp lens according to the present invention will be hereinafter described with reference to the drawings. The embodiments shown are applied to a vehicular lamp lens 1 wherein two lens members have been joined by welding.

The vehicular lamp lens 1 is formed by welding two lens members 2 and 3 together. The manner in which the welding operation is carried out is not particularly limited.

Figure 1:
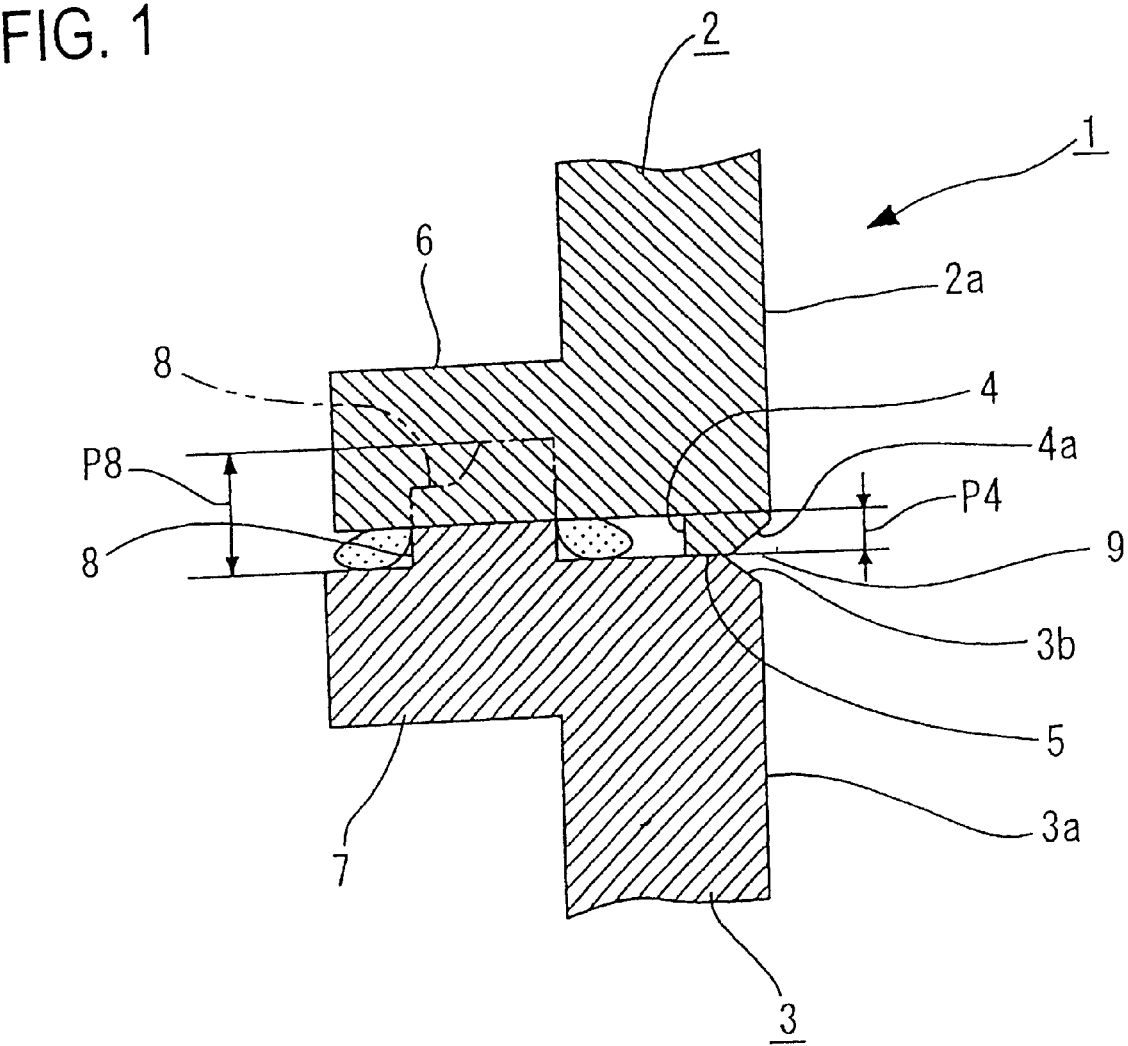
FIG. 1 is an enlarged sectional view of the essential portions of the vehicular lamp lens according to a preferred embodiment of the present invention.

FIG. 1 illustrates a vehicular lamp lens constructed according to a preferred embodiment of the present invention. A welding leg 4 protrudes from a joint end portion of lens member 2 toward lens member 3. That is, the welding leg 4 protrudes from the side of the lens member 2 to which the lens member 3 is welded. The front surface of the welding leg 4 is inclined toward the rear in the direction of a boundary 5 located between the welding leg 4 and the lens member 3 to form an inclined surface 4a. Furthermore, a joint leg 6 is formed on the joint end portion of the lens member 2 protruding in the rearward direction.

A joint leg 7 and a welding leg 8 are formed on the joint end portion of the lens member 3. The joint leg 7 protrudes toward the rear of the lens, and the welding leg 8 protrudes toward the lens member 2 from the portion near the rear end of the joint leg 7. The shape of welding leg 8 prior to welding is shown by the alternate long and two short dashed line in FIG. 1. The length of protrusion P8 of the welding leg 8 is much larger than the length of protrusion P4 of the welding leg 4 positioned on the surface side 2a of lens member 2.

Also, near the boundary 5 a front surface 3a of the lens member 3 is inclined toward the rear of the lens in the direction of the boundary 5 to form an inclined surface 3b.

During welding, both joint end portions are first abutted against one another for welding the two lens members 2, 3 by, for example, a vibration welding method. That is, the tip end surface of the welding leg 8 of the lens member 3 is abutted against the joint leg 6 of the lens member 2. Vibration is then applied to one or both of the lens members 2, 3 such that the portion where the welding leg 8 of the lens member 3 and the joint leg 6 of the lens member 2 contact one another melts, integrating the two legs together. Next, the welding leg 4 of the lens member 2 is abutted against the joint end surface of the lens member 3, vibration is stopped, and the portion between the welding leg 4 and the lens member 3 against which the welding leg 4 is abutted melts slightly.

An indentation, that is, a cross-sectional V-shaped groove 9 (shown in FIG. 1), is formed by the two inclined surfaces 3b, 4a in the boundary portion 5 of the lens members 2, 3 welded as described above.

In the vehicular lamp lens 1, since the V-shaped groove 9 is formed between the two lens members 2, 3 joined by welding, even if there is some front/rear deviation between the lens members, the deviation will not visually stand out because of the V-shaped groove 9. In addition, even when rubbing a finger across the boundary portion 5 of the lens members 2, 3, the slight deviation between the lens members 2, 3 is hardly felt because the sensation on the finger from the V-shaped groove 9 is far more noticeable.

Figure 2:
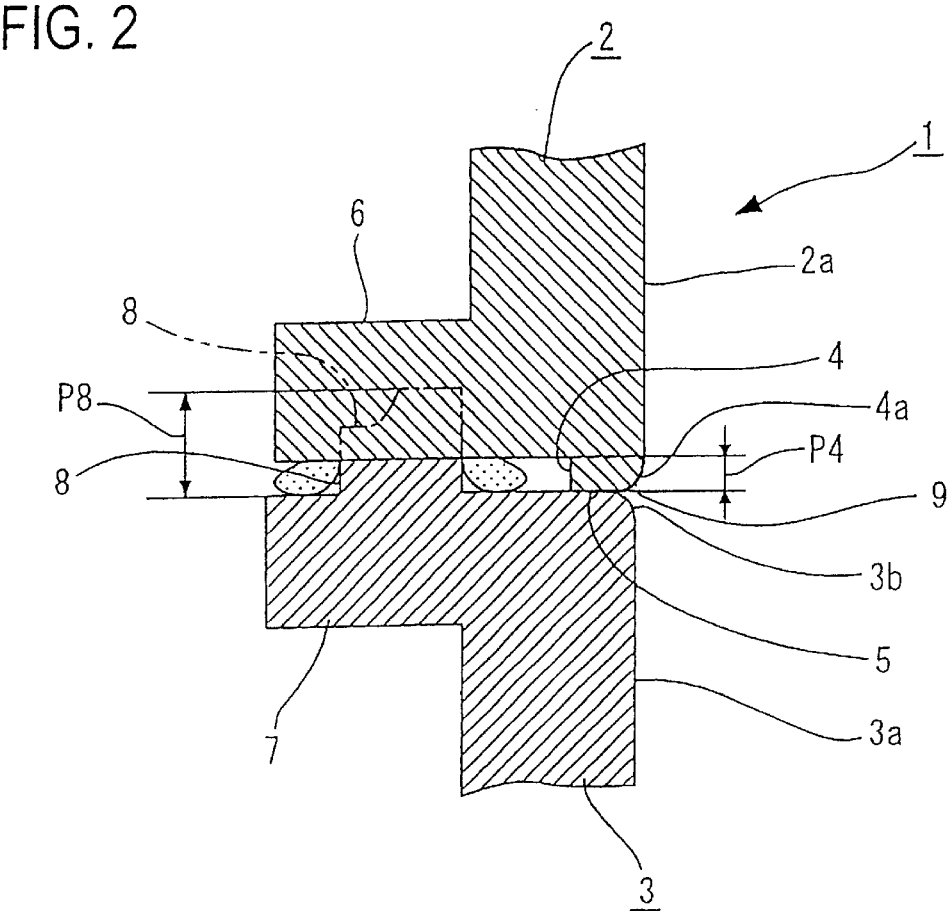
FIG. 2 is an enlarged sectional view of the essential portions of the vehicular lamp lens according to another embodiment of the present invention.
Figure 3:
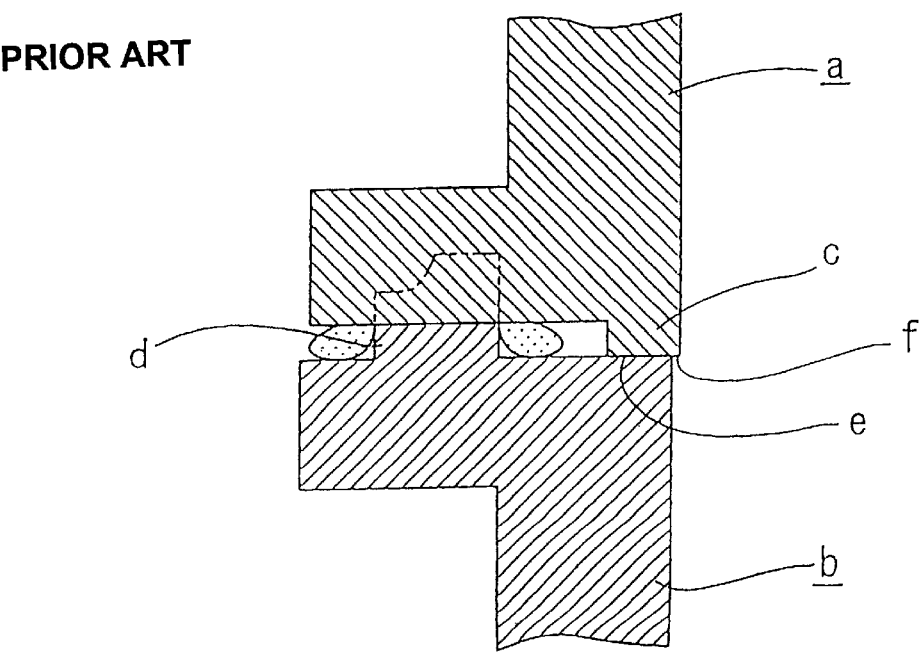
FIG. 3 is an enlarged sectional view of the essential portions of a known vehicular lamp lens.

In the vehicular lamp lens 1 described above, the front surfaces of the lens members 2, 3 are rearwardly displaced (i.e., indented) in the form of inclined surfaces 4a, 3b. (See FIG. 1.) Alternatively, the front surfaces may be rearwardly displaced in the form of bowed surfaces, as shown in FIG. 2.

Also, it is not necessary to form an indentation (i.e., either an inclined or bowed surface) on each of the lens members 2, 3. Forming an indentation on at least one of the lens members 2, 3 enables the object of the invention to be achieved. However, forming an indentation on each of the lens members 2, 3 further improves the appearance as well as the feel of the lamp lens.

In the foregoing embodiment, a vehicular lamp lens 1 wherein two partial lenses have been integrated has been given as an example. However, the present invention can also be applied to a vehicular lamp lens wherein three or more lens members are integrated.

The shape and structure of each portion shown in the foregoing embodiment represent only one specific example of the present invention. However, the technical scope of the present invention is not limited thereto.

As clarified by the aforementioned description, the vehicular lamp lens according to the present invention wherein a plurality of lens members are welded together is characterized in that the surface of the boundary portion side of at least one of the lens members welded together is displaced or indented toward the rear of the lens as the surface becomes closer to the boundary.

Therefore, in the vehicular lamp lens according to the present invention, even if a deviation between two lens portions occurs during welding, since the deviation is located where there is an indentation, this deviation does not visually stand out. In addition, when touched with a finger, the deviation is almost unnoticeable because the original indentation makes a stronger impression.

What is claimed is:

1. A vehicular lamp lens, wherein at least two lens members are integrated together, the lens members each having a front surface, the front surfaces being joined together at a boundary between the lens members, wherein:

the front surface of at least one of the lens members is displaced in the rearward direction as the front surface becomes closer to the boundary between the at least one lens member and another one of the lens members to which the at least one lens member is integrated, and the displaced front surface of the at least one lens member forms an indentation.

2. A vehicular lamp lens, comprising:

a first lens member; and a second lens member integrated with the first lens member and forming a boundary therebetween;

wherein the front surface of the boundary side of said first lens member is displaced in the rearward direction as it becomes closer to the boundary so as to form a first indentation.

3. The vehicular lamp lens of claim 2, wherein the front surface of the boundary side of said second lens member is displaced in the rearward direction as it becomes closer to the boundary so as to form a second indentation.

4. The vehicular lamp lens of claim 3, wherein the first and second indentations are each an inclined surface, together forming a V-shaped groove.

5. The vehicular lamp lens of claim 3, wherein the first and second indentations are each a bowed surface.

6. The vehicular lamp lens of claim 2, wherein the first indentation is an inclined surface.

7. The vehicular lamp lens of claim 2, wherein the first indentation is a bowed surface.

8. A vehicular lamp lens, wherein at least two lens members are integrated together, the lens members each having a front surface, the front surfaces being joined together at a boundary between the lens members, wherein:

the front surface of at least one of the lens members is displaced in the rearward direction as the front surface becomes closer to the boundary between the at least one lens member and another one of the lens members to which the at least one lens member is integrated, and the lens members that are integrated together each have at least one welding leg for integrating the lens members by welding.

9. The vehicular lamp lens of claim 8, wherein at least one of the lens members has a joint leg and the at least one welding leg extends from said joint leg.

10. The vehicular lamp lens of claim 9, wherein the front surface of at least one of said lens members displaced in the rearward direction forms an indentation at the boundary between said lens members.

11. The vehicular lamp lens of claim 8, wherein each of said welding legs extends toward and abuts an opposing lens member.

12. The vehicular lamp lens of claim 11, wherein the welding legs for one lens member are spaced apart from the welding legs for an opposing lens member.

13. The vehicular lamp lens of claim 12, wherein said front surface of said at least one lens member that is displaced in the rearward direction is a front surface of the welding legs for said at least one lens member.

* * * * *